Jan. 27, 1953   A. S. LEIGHTON   2,626,672
TWO-WHEELED TRACTOR

Filed Sept. 27, 1947   2 SHEETS—SHEET 1

INVENTOR.
ARTHUR S. LEIGHTON
BY Spear & Spear
ATTORNEYS

Jan. 27, 1953        A. S. LEIGHTON        2,626,672
TWO-WHEELED TRACTOR
Filed Sept. 27, 1947        2 SHEETS—SHEET 2
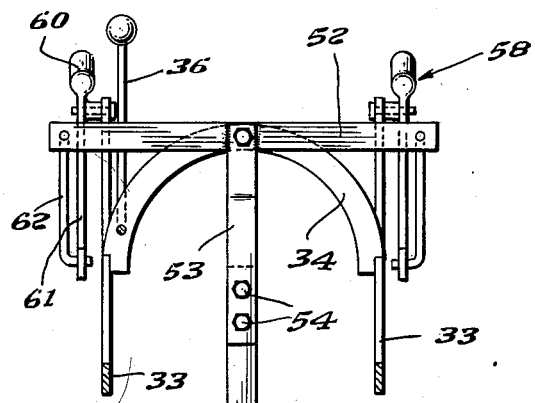
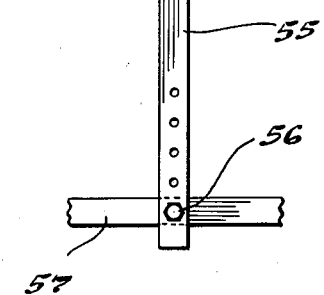
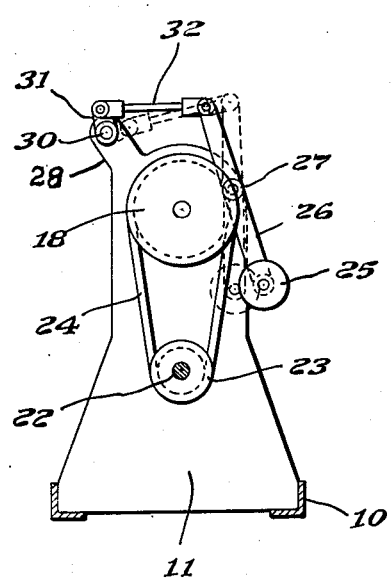
INVENTOR.
ARTHUR S. LEIGHTON
BY
Spear & Spear
ATTORNEYS Patented Jan. 27, 1953

2,626,672

UNITED STATES PATENT OFFICE 2,626,672

TWO-WHEELED TRACTOR

Arthur S. Leighton, Portland, Maine

Application September 27, 1947, Serial No. 776,481

4 Claims. (Cl. 180—19)

My present invention relates to two wheeled tractors and to their connection with a towed unit.

Two wheeled tractors have proved to be of real value, particularly where relatively small areas are to be plowed or are under cultivation. There are, however, several objectionable features to them which seriously limit their utility.

These objections are that such a tractor is not sufficiently flexible in use to meet actual operating conditions which frequently require either a reverse drive or a change of its speed regardless of the particular use to which the tractor is being put. While such tractors are adapted to tow a wide variety of units, such units are commonly a plow, harrow, or cultivator.

When such a tractor is used with a cultivator, for example, considerable difficulty exists both as to the control of the cultivator and the ease with which such control may be effected. Where the rows to be cultivated are not perfectly straight, it is necessary for the operator to so steer the tractor as to maintain the cultivator in desired relation to the plants. With the usual two wheeled tractor and the usual connection between it and the cultivator or other tractor unit, any shift in the direction of the tractor's travel is attended by a lateral shift of the unit at its pivotal connection to the draw bar of the tractor. This has the disadvantage that substantial effort is required in steering and the undesirable consequence, particularly in cultivating, of bringing the cultivator into contact with or too close to the plants.

In accordance with my invention, I provide a two wheeled tractor, the drive for which includes a transmission and a differential unit with the transmission preferably providing both a reverse drive and a plurality of forward speeds. I accomplish this result by providing a frame with a differential unit supported between its ends and having its propeller shaft rearwardly disposed. The engine is mounted adjacent the front end of the frame and its crankshaft is coupled to the drive shaft of the transmission by any suitable clutch means such as a belted connection under the control of a belt tightener. The transmission is located above the differential unit and includes a rearwardly extending driven shaft which, adjacent the rear end of the tractor, is connected to the propeller shaft, preferably by a vertically disposed gear train providing a suitable speed reduction between those two shafts.

The frame of my tractor includes at its rear a draw bar to which the trailer unit is to be pivotally connected and upwardly inclined arms interconnected by a transverse support to which is centrally pivoted a lever having a depending arm to be pivotally connected to the trailer unit rearwardly of its pivoted connection to the tractor. As a consequence, when the tractor is steered as by swinging its rear end to one side or the other, the lever is rocked because of its connection with the unit. A handle is pivoted to each arm and includes a handle portion and an end portion extending forwardly into the zone of the lever so that its end portion may be connected to the adjacent end of the lever by a link.

In accordance with my invention, the end portions of the handles are sufficiently longer than their handle portions so that it is impossible for the operator to steer the tractor by pushing down on one handle portion and lifting the other as that mode of operation would seriously interfere with the extent to which the tractor could be turned relative to its towed unit and would require substantial movement of the handle portions because of the required leverage. As a consequence, my tractor may be steered by the handles only by swinging them laterally as a unit to one side or the other. Such movement results, however, in an equal but opposite movement of the handles so that they are conveniently repositioned for the operator whenever he changes the direction of the tractor's travel.

In the accompanying drawings, I have shown an illustrative embodiment of my invention from which its several novel features and advantages will be readily apparent.

Figure 1:
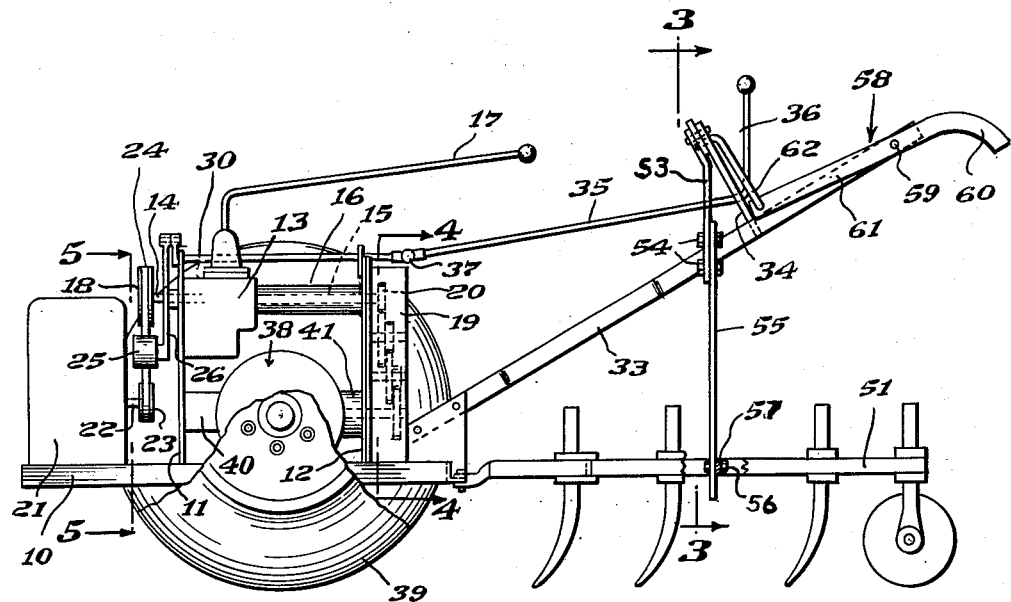
Fig. 1 is a side view of a tractor in accordance with my invention with a cultivator connected to it.
Figure 2:
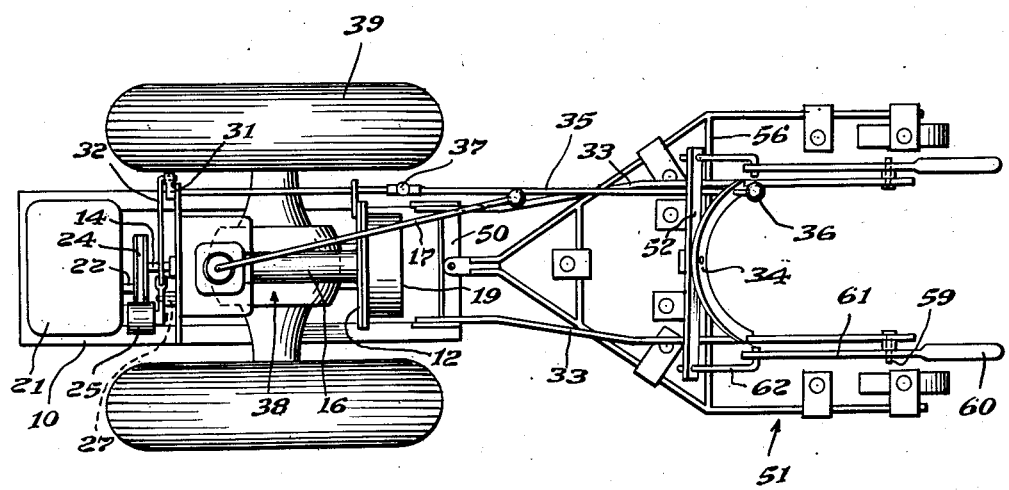
Fig. 2 is a top plan view of the tractor of Fig. 1.

Figs. 3, 4, and 5 are enlarged sections along the lines 3—3, 4—4, and 5—5 respectively of Fig. 1.

In the embodiment of my invention shown in the drawings, I have indicated the frame at 10 having a pair of spaced partitions 11 and 12. Between the partitions 11 and 12, I mount a transmission unit 13 a substantial distance above the frame 10.

The transmission unit 13 may be of any desired type and preferably provides a reverse drive as well as a choice of forward speeds. I have indicated its drive shaft at 14, its driven shaft at 15 within the tubular housing 16, and a gear shift lever 17 extending rearwardly of the tractor to be conveniently accessible to the operator.

The drive shaft 14, forwardly of the partition 11, has a pulley 18 and fast on the rear end of the driven shaft 15 and housed in the gear box 19 is a gear 20.

Any suitable engine 21 is mounted on the frame 10 adjacent its front end. Its crankshaft is indicated at 22 and fast on it is a pulley 23. A belt 24 is trained over the pulleys 18 and 23 and to provide an easily operated and reliable clutch, I provide a belt tightener which consists of a roller 25 rotatably mounted on a lever 26 pivoted as at 27 to the partition 11. The walls 11 and 12 have ears 28 and 29 having alined apertures through which extends a shaft 30 having on its front end a crank 31 to which and to the lever 26 is pivotally connected a link 32, see Fig. 5. By rotating the shaft 30 in one direction or another, the roller 25 is carried into or out of a belt tightening position. In the belt tightening position of the roller 25, the pivotal connection between the link 32 and the crank 31 passes slightly beyond dead center so that the pressure of the belt 24 against the roller 25 is ineffective to render the belt tightening means inoperative.

Secured to the rear end of the frame 10 are a pair of spaced upwardly inclined arms 33 interconnected adjacent their rear ends by an arcuate support 34 apertured to receive the shaft 35 of the operating crank 36 which is located conveniently adjacent the operator. The end of the shaft 35 is shown as connected to the shaft 30 by a universal joint 37.

At 38, I have indicated generally a differential gear unit which may be of any desired type and to its axles are conventionally attached the wheels 39. The differential gear unit 38 is supported by the brace 40 and by the tubular housing 41 for its propeller shaft 42 below the transmission unit 13. One end of the propeller shaft 42 has a gear 43 housed within the gear box 19. The gears 20 and 43 are preferably interconnected by a vertically arranged gear train effecting a substantial speed reduction between the shafts 15 and 42. As may be most clearly seen in Fig. 4, my gear train includes spur gears 44 and 45. While step gears may be used, I prefer to mount separately smaller gears 46 and 47 on the spindles 48 and 49 on which the gears 44 and 45, respectively, are mounted. The gear 44 meshes with the gear 20 while the gear 46 meshes with the gear 45 and the gear 47 meshes with the propeller shaft gear 42.

The frame 10 has a draw bar 50 to which a cultivator, harrow, plow, or the like may be pivotally connected. For convenience, I have indicated a cultivator generally at 51.

A lever 52 is pivotally mounted on the support 34 and includes a depending arm 53 to which is rigidly secured as by bolts 54 an extension 55 pivotally connected as at 56 to the cross member 57 of the cultivator 51 rearwardly of its connection to the draw bar. By this construction, when the tractor is steered by shifting its rear end to one side or the other, the lever 52 is rocked.

I provide a pair of handles generally indicated at 58, each of which is pivotally attached to one of the arms 33 as at 59 to establish a rearwardly extending handle portion 60 and an end portion 61 extending forwardly and connected to an adjacent end of the lever 52 by a link 62. In accordance with my invention, the end portions 61 are much longer than the handle portions 60 so that insufficient leverage exists to enable the operator to steer the tractor by pushing down on one handle portion and lifting up on the other as such a mode of operation would require such substantial movement of the handle portions to meet the leverage requirements that it would be impractical to provide a steering range to meet typical operating conditions.

In accordance with my invention, steering is effected by the operator swinging the handles 58 to one side or another. Such steering results in equal but opposite movement of the handle portions 60 repositioning them for the convenience of the operator.

While I have added transmission and differential gear units, tractors in accordance with my invention are suitably compact and have their weight properly distributed relative to their wheels. At the same time, they are well adapted to give efficient and economical service which, combined with their adaptability and maneuverability, renders them admirably adapted to meet a wide range of operating conditions.

What I therefore claim and desire to secure by Letters Patent is:

1. A two wheeled tractor comprising a frame, first and second longitudinally spaced, transverse partition members supported thereby in spaced relation to each other and to the ends of said frame and having alined apertures throughout, a pair of upwardly extending arms secured to said frame rearwardly of said first member, a support connecting said arms and having an aperture therethrough, an engine supported by said frame forwardly of said second member and including a crank shaft, a differential gear unit supported between said members and including a pair of wheels and a propeller shaft, power transmission means supported by both of said members and connected to said propeller shaft and including a drive shaft extending forwardly of said second member and above said crank shaft, a belted connection between said crank and drive shafts and belt tightening means carried by said second member and including an operator control to render said means effective and ineffective, said means comprising a member rotatably mounted in the apertures of said partition members, a crank rotatably mounted in the aperture in said support, and a universal connection between said crank and said rotatable member.

2. A two wheeled tractor comprising a frame, first and second longitudinally spaced, transverse partition members supported thereby in spaced relation to each other and to the ends of said frame and having alined apertures throughout, a pair of upwardly extending arms secured to said frame rearwardly of said first member, a support connecting said arms and having an aperture therethrough, an engine supported by said frame forwardly of said second member and including a crankshaft, a differential gear unit supported between said members and including a pair of wheels and a propeller shaft, power transmission means supported by both of said members and connected to said propeller shaft and including a drive shaft extending forwardly of said second member and above said crankshaft, and means to connect said crank and drive shafts, said means including an operator control mounted in the apertures of said partition members and said support.

3. A two wheeled tractor comprising a frame, first and second longitudinally spaced, transverse partition members supported thereby in spaced relation to each other and to the ends of said frame, a pair of upwardly extending arms secured to said frame rearwardly of said first member, a support connecting said arms, an engine supported by said frame forwardly of said second member and including a crankshaft, a differential gear unit supported between said members and including a pair of wheels and a propeller shaft, power transmission means supported by both of said members and connected to said propeller and including a drive shaft extending forwardly of said second member and above said crankshaft, a driven shaft extending rearwardly of said first member and above said propeller shaft, means carried by said second member to connect said drive and crankshafts, a control for said means extending rearwardly of said frame and supported in part by said support, and means carried by said first member interconnecting said driven and propeller shafts.

4. A two wheeled tractor comprising a frame, first and second longitudinally spaced, transverse partition members supported thereby in spaced relation to each other and to the ends of said frame, a pair of upwardly extending arms secured to said frame rearwardly of said first member, an engine supported by said frame forwardly of said second member and including a crankshaft, a differential gear unit supported between said members and including a pair of wheels and a propeller shaft, power transmission means supported by both of said members and including a drive shaft extending forwardly of said second member and above said crankshaft and a driven shaft extending rearwardly of said first member and above said propeller shaft, means carried by said second member to connect said drive and crankshafts, and means carried by said first member interconnecting said driven and propeller shafts.

ARTHUR S. LEIGHTON.

REFERENCES CITED

The following references are of record in the file of this patent:

UNITED STATES PATENTS

| Number | Name | Date |
| --- | --- | --- |
| 1,297,536 | Brown | Mar. 18, 1919 |
| 1,443,951 | George | Feb. 6, 1923 |
| 1,953,749 | Curtis | Apr. 3, 1934 |
| 2,003,718 | McCarthy et al. | June 4, 1935 |
| 2,052,068 | Ziegler | Aug. 25, 1936 |
| 2,085,312 | Gourley | June 29, 1937 |
| 2,134,387 | Zimka et al. | Oct. 25, 1938 |
| 2,514,917 | Walstrom | July 11, 1950 |

FOREIGN PATENTS

| Number | Country | Date |
| --- | --- | --- |
| 420,542 | Great Britain | Dec. 4, 1934 |
| 595,695 | Great Britain | Dec. 12, 1947 |